US010515343B1

(12) United States Patent
Kim et al.

(10) Patent No.: US 10,515,343 B1
(45) Date of Patent: Dec. 24, 2019

(54) METHOD AND SYSTEM FOR REPORTING AND MONITORING LOCATION-RELATED ACTIVITIES OF MOBILE DEVICES

(71) Applicant: BLUE NIGHT CO., LTD., Seoul (KR)

(72) Inventors: Jinyong Kim, Seoul (KR); Wonyoung Choi, Suwon-si (KR)

(73) Assignee: BLUE NIGHT CO., LTD., Seoul (KR)

( * ) Notice: Subject to any disclaimer, the term of this patent is extended or adjusted under 35 U.S.C. 154(b) by 0 days.

(21) Appl. No.: 16/430,180

(22) Filed: Jun. 3, 2019

(51) Int. Cl.
  *G06Q 10/10* (2012.01)
  *H04L 29/06* (2006.01)

(52) U.S. Cl.
  CPC ....... *G06Q 10/1091* (2013.01); *H04L 63/083* (2013.01); *H04L 63/0876* (2013.01); *H04L 63/107* (2013.01)

(58) Field of Classification Search
  CPC .. G06Q 10/10; G06Q 10/109; G06Q 10/1091; H04L 63/0876; H04L 63/083; H04L 63/107
  See application file for complete search history.

(56) References Cited

U.S. PATENT DOCUMENTS

| 6,915,135 | B1 | 7/2005 | McKee et al. |
| 7,957,725 | B2 | 6/2011 | Van Erlach |
| 7,974,606 | B2 | 7/2011 | Lo et al. |
| 9,172,705 | B1 | 10/2015 | Kong et al. |
| 9,357,053 | B2 * | 5/2016 | Gruberman ........... H04W 8/245 |
| 9,471,900 | B1 * | 10/2016 | Boustany ................. G07C 1/10 |
| 9,628,956 | B1 | 4/2017 | Kim |
| 2009/0233623 | A1 | 9/2009 | Johnson |
| 2013/0217332 | A1 | 8/2013 | Altman et al. |
| 2014/0222573 | A1 | 8/2014 | Middleton et al. |
| 2015/0347827 | A1 * | 12/2015 | Dickinson .......... G06K 9/00302 382/103 |
| 2016/0100311 | A1 | 4/2016 | Kumar |
| 2016/0156638 | A1 | 6/2016 | Somani et al. |

(Continued)

FOREIGN PATENT DOCUMENTS

| CN | 104392501 A | 3/2015 |
| JP | 2005-181147 A | 7/2005 |

(Continued)

OTHER PUBLICATIONS

International Search Report of PCT Application No. PCT/IB2016/001231—3 pages (dated Mar. 15, 2017).

(Continued)

*Primary Examiner* — Sharad Rampuria
(74) *Attorney, Agent, or Firm* — Knobbe Martens Olson & Bear LLP

(57) ABSTRACT

This application relates to reporting and monitoring a location of a mobile device. Disclosed is an attendance recording service in which when an employee requests attendance recording using a mobile application installed in a smartphone, the smartphone communicates with a server and records clock-in and clock-out of the employee. When the employee selects an attendance recording request button from the mobile application, an analysis is made as to whether the employee is positioned in a workplace, and clock-in or clock-out of the employee is recorded only when it is determined that the employee is positioned in the workplace, thereby maintaining reliable attendance recording.

17 Claims, 14 Drawing Sheets

(56) References Cited

U.S. PATENT DOCUMENTS

2016/0171451 A1* 6/2016 Pugh ................. G06Q 10/1093
                                                                  705/7.18
2016/0174022 A1    6/2016 Nhu

FOREIGN PATENT DOCUMENTS

| JP | 2011-205502 A    | 10/2011 |
|----|------------------|---------|
| KR | 10-0994840 B1    | 11/2010 |
| KR | 10-2014-0021348 A | 2/2014  |
| KR | 10-2014-0068736 A | 6/2014  |
| WO | 2012/151351 A1   | 11/2012 |
| WO | 2015/061673 A1   | 4/2015  |

OTHER PUBLICATIONS

Bae et al., "Design and Implementation of Automatic Attendance Check System Using BLE Beacon", International Journal of Multimedia and Ubiquitous Engineering, vol. 10, No. 10—12 pages (2015).
Extended European Search Report of corresponding Patent Application No. 16834714.4—12 pages (dated Jul. 19, 2018).

* cited by examiner

Workplace DB

| Workplace ID | Manager contact | open hours | installed Beacon ID | working Employee ID |
|---|---|---|---|---|
| store 0987 | +1-777-555-5124 | 9am-5pm weekdays | C1:D2:A3:44:C1:44 | Staff 6454 Staff 6414 |
| store 1458 | +1-949-555-3968 | 1pm-5pm Saturdays | E1:D3:CC:EE:A1:D4 | Staff 7845 |
| store 9425 | +1-949-555-9874 | 11am-7pm weekdays | E1:D3:CC:EE:A1:D4 | Staff 7999 |

FIG. 11

Employee DB

| Employee ID | Employee contact | Smartphone model | Smartphone OS | Smartphone hardware ID | registered workplace | working schedule |
|---|---|---|---|---|---|---|
| Staff 0413 | +1-640-555-1024 | iPhone 6 | iOS 9.3 | 147522244555557 | store 0987 | 9am-5pm weekdays |
| Staff 0188 | +1-404-555-1457 | Galaxy S5 | Android 4.5 | 014124885774522 | store 1458 | 9am-5pm weekdays |
|  |  |  |  |  | store 9425 | 1pm-5pm Saturdays |
| Staff 2920 | +1-949-555-1457 | LG G5 | Android 5.0 | 214541657835465 | store 1475 | 11am-3pm weekends |

FIG. 12

Beacon DB

| Beacon ID | installed workplace ID | Initialized / installed | battery replaced | beacon pin |
|---|---|---|---|---|
| C1:D2:A3:44:C1 :44 | Store 5874 | 2014-07-11 | 2016-01-11 | 119811 |
| E1:D3:CC:EE:A1 :D4 | Store 5874 | 2015-11-12 | N/A | 020208 |
| E1:D3:CC:EE:A1 :D4 | Store 0413 | 2015-12-30 | N/A | 987114 |

FIG. 13

Attendance Log DB

| Workplace ID | Employee ID | Clock-in Time | Clock-out Time | Clock-in Smartphone model ID | Clock-out Smartphone model ID | Clock-in Beacon ID | Clock-out Beacon ID |
|---|---|---|---|---|---|---|---|
| Store 4447 | Staff 0147 | 2016-07-25 08:44:55 | 2016-07-25 17:01:55 | iPhone 6 | iPhone 6 | 05893 | 05893 |
| Store 4447 | Staff 0147 | 2016-07-26 08:59:01 | 2016-07-26 16:59:01 | iPhone 6 | Galaxy S7 | 05893 | 05893 |
| Store 4447 | Staff 7412 | not reported | 2016-07-26 17:15:01 | Lumia 640 | Lumia 640 | 05893 | 05893 |
| Store 7845 | Staff 0478 | 2016-07-25 16:00:55 | 2016-07-25 21:10:55 | iPhone 6 | iPhone 6 | 99994 | 99994 |
| Store 4417 | Staff 0478 | 2016-07-28 19:55:10 | not reported | iPhone 6 | iPhone 6 | 14785 | 14785 |

FIG. 14

METHOD AND SYSTEM FOR REPORTING AND MONITORING LOCATION-RELATED ACTIVITIES OF MOBILE DEVICES

BACKGROUND

The present disclosure relates to confirming and recording attendance of employees in workplaces.

Workplace computers are used for reporting attendance of employees. With advancement of wireless communication technologies, smartphones can be used for confirming and recording the attendance.

SUMMARY

One aspect of the invention provides a method of attendance recording. The method includes one or more of the features listed below:

providing at least one database comprising data identifying a first employee, a first facility where the first employee works and a first beacon for use in the first facility, wherein in the at least one database, a first employee datum identifying the first employee is linked to a first facility datum uniquely identifying the first facility, wherein the first facility datum is linked to a first beacon datum uniquely identifying the first beacon in the at least one database;

providing the first beacon for installation in the facility, wherein the first beacon is configured to broadcast beacon signals comprising a first segment and a second segment that is separate from the first segment, wherein the first segment carries a first media access control (MAC) address uniquely identifying the first beacon, wherein the second segment carries a first code that can be decoded into at least a portion of the first MAC address, wherein the first code comprises at least one invisible character that has no visual representation when the first code is displayed on the first mobile terminal;

providing a mobile application for installing on a first mobile terminal of the first employee, the mobile application is configured to perform communication between the server and the first mobile terminal;

providing a server comprising at least one computing device configured to communicate with the first mobile terminal and further configured to access the data stored in the at least one database;

subsequent to installation of the first beacon in the first facility and further subsequent to installation of the mobile application on the first mobile terminal, authenticating the first employee base on communication between the server and the first mobile terminal such that the server locates the first employee datum of the first employee in the at least one database, wherein authenticating the first employee is performed;

subsequent to authentication of the first employee, locating, in the at least one database, the first beacon datum identifying the first beacon, using on the first employee datum available from authentication of the first employee, wherein the first beacon datum can be located using the first employee datum as the first employee datum is linked to the first facility datum and the first facility datum is linked to the first beacon datum in the at least one database;

in response to the first employee's command for reporting attendance on the first mobile terminal, processing the second segment to decode the first code comprising at least one invisible character for obtaining at least a portion of the first MAC address without referencing to the first segment, wherein processing the second segment is performed by the server, by the first mobile terminal, or by the server and the first mobile terminal in combination;

subsequent to locating the first beacon datum in the at least one database and further subsequent to processing of the second segment to decode the first code, determining if the at least a portion of the first MAC address decoded from the first code matches the first beacon datum located in the at least one database;

upon determining that the first MAC address decoded from the first code matches the first beacon datum located in the at least one database, recording, in the at least one database, the first employee's attendance at the first facility.

The method of attendance recording further includes one or more of the additional features listed below:

the mobile application is not capable of retrieving the first MAC address from the first segment of the beacon signals;

the mobile application is configured to retrieve or access, from the second segment of the beacon signals, the first code that can be decoded into the at least a portion of the first MAC address;

the mobile application processes the second segment to obtain the first code and transmits the first code to the server;

the mobile application forwards data of the second segment without further processing to retrieve the first code from the second segment;

the server receives the first code or data of the second segment from the first mobile terminal, and processes the first code or data of the second segment to obtain at least a portion of the first MAC address;

the first code comprises at least one invisible character that has no visual representation when a web browser of the first mobile displays the first code;

the first code comprises at least one invisible character selected among a set of invisible characters corresponding to American Standard Code for Information Interchange (ASCII) code 1 to ASCII code 31, and ASCII code 127;

the second segment carries the first beacon's name, wherein the first beacon's name in the second segment comprises at least a portion of the first code.

the second segment carries an Universally Unique IDentifier (UUID) of the first beacon, wherein the UUID in the second segment includes at least a portion of the first code the second segment carries an a Major number of the first beacon, wherein the Major number in the second segment includes at least a portion of the first code the second segment carries an a Minor number of the first beacon, wherein the Minor number in the second segment includes at least a portion of the first code the beacon signals further comprise a third segment carrying an Universally Unique IDentifier (UUID) of the first beacon, and the beacon signals further comprise a fourth segment carrying a Major number of the first beacon, and further comprise and a fifth segment that carrying a Minor number of the first beacon.

Another aspect of the invention provides a beacon device for use in attendance recording. The beacon devices comprises at least one memory, at least one wireless communication module, and at least one controller configured to access data stored on the at least one memory and further configured to control the at least one wireless communication module for generating beacon signals wherein the beacon is configured to broadcast beacon signals. The beacon device provides one or more of the features listed below:

the beacon signals comprise a first segment and a second segment separate from the first segment, wherein the first segment carries a first media access control (MAC) address unique to the first beacon and the second segment carries a first code that can be decoded into at least a portion of the first MAC address; and the first code comprises at least one invisible character that has no visual representation when a mobile terminal that received the beacon signals displays the first code.

Another aspect of the invention provides a system for attendance recording. The system includes one or more of the features listed below:

at least one database comprising data identifying a first employee, a first facility where the first employee works and a first beacon for use in the first facility, wherein in the at least one database, a first employee datum identifying the first employee is linked to a first facility datum uniquely identifying the first facility, wherein the first facility datum is linked to a first beacon datum uniquely identifying the first beacon in the at least one database;

a first beacon for installation in the facility, wherein the first beacon is configured to broadcast beacon signals comprising a first segment and a second segment that is separate from the first segment, wherein the first segment carries a first media access control (MAC) address uniquely identifying the first beacon, wherein the second segment carries a first code that can be decoded into at least a portion of the first MAC address, wherein the first code comprises at least one invisible character that has no visual representation when the first code is displayed on the first mobile terminal;

a mobile application for installing on a first mobile terminal of the first employee, the mobile application is configured to perform communication between the server and the first mobile terminal;

a server comprising at least one computing device configured to communicate with the first mobile terminal and further configured to access the data stored in the at least one database.

The system further includes one or more of the additional features listed below:

subsequent to installation of the first beacon in the first facility and further subsequent to installation of the mobile application on the first mobile terminal, authenticating the first employee base on communication between the server and the first mobile terminal such that the server locates the first employee datum of the first employee in the at least one database, wherein authenticating the first employee is performed by the server, by the first mobile terminal, or by the server and the first mobile terminal in combination;

subsequent to authentication of the first employee, locating, in the at least one database, the first beacon datum identifying the first beacon, using on the first employee datum available from authentication of the first employee, wherein the first beacon datum can be located using the first employee datum as the first employee datum is linked to the first facility datum and the first facility datum is linked to the first beacon datum in the at least one database;

in response to the first employee's command for reporting attendance on the first mobile terminal, processing the second segment to decode the first code comprising at least one invisible character for obtaining at least a portion of the first MAC address without referencing to the first segment, wherein processing the second segment is performed by the server, by the first mobile terminal, or by the server and the first mobile terminal in combination;

subsequent to locating the first beacon datum in the at least one database and further subsequent to processing of the second segment to decode the first code, determining if the at least a portion of the first MAC address decoded from the first code matches the first beacon datum located in the at least one database;

upon determining that the first MAC address decoded from the first code matches the first beacon datum located in the at least one database, recording, in the at least one database, the first employee's attendance at the first facility.

The foregoing method, system or beacon device may further include one or more of the additional features that are defined in the original claims such that the system, method, system or beacon device may include two or more features that are defined in different claims.

BRIEF DESCRIPTION OF THE DRAWINGS

FIG. 11 is an example of workplace data according to one embodiment.

FIG. 12 is an example of employee data according to one embodiment.

FIG. 13 is an example of beacon data according to one embodiment.

FIG. 14 is an example of attendance event records according to one embodiment.

DETAILED DESCRIPTION OF EMBODIMENTS

Hereinafter, embodiments of the present invention will be described with reference to the drawings. These embodiments are provided for better understanding of the present invention, and the present invention is not limited only to the embodiments. Changes and modifications apparent from the embodiments still fall in the scope of the present invention.

Meanwhile, the claims constitute part of the detailed description of this application.

Attendance Recording System

Figure 1:
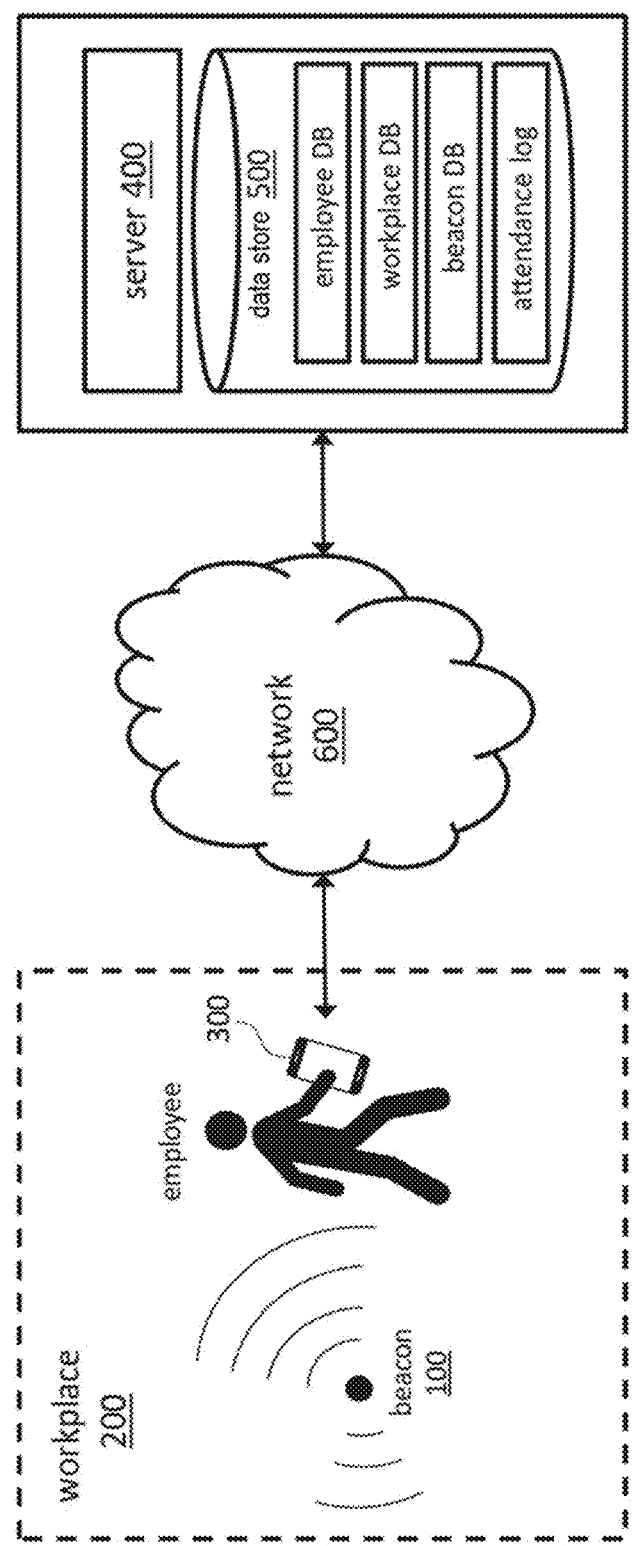
FIG. 1 illustrates an attendance recording system according to an embodiment of the present invention.
Figure 2:
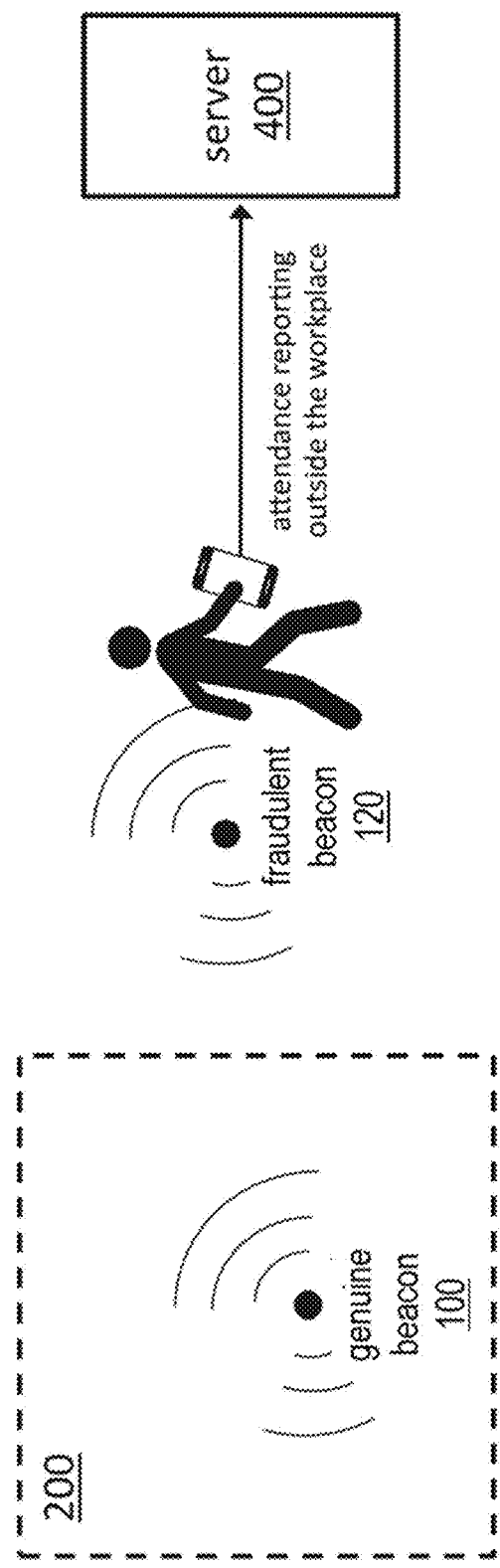
FIG. 2 illustrates use of a fraudulent beacon for attendance reporting.
Figure 3:
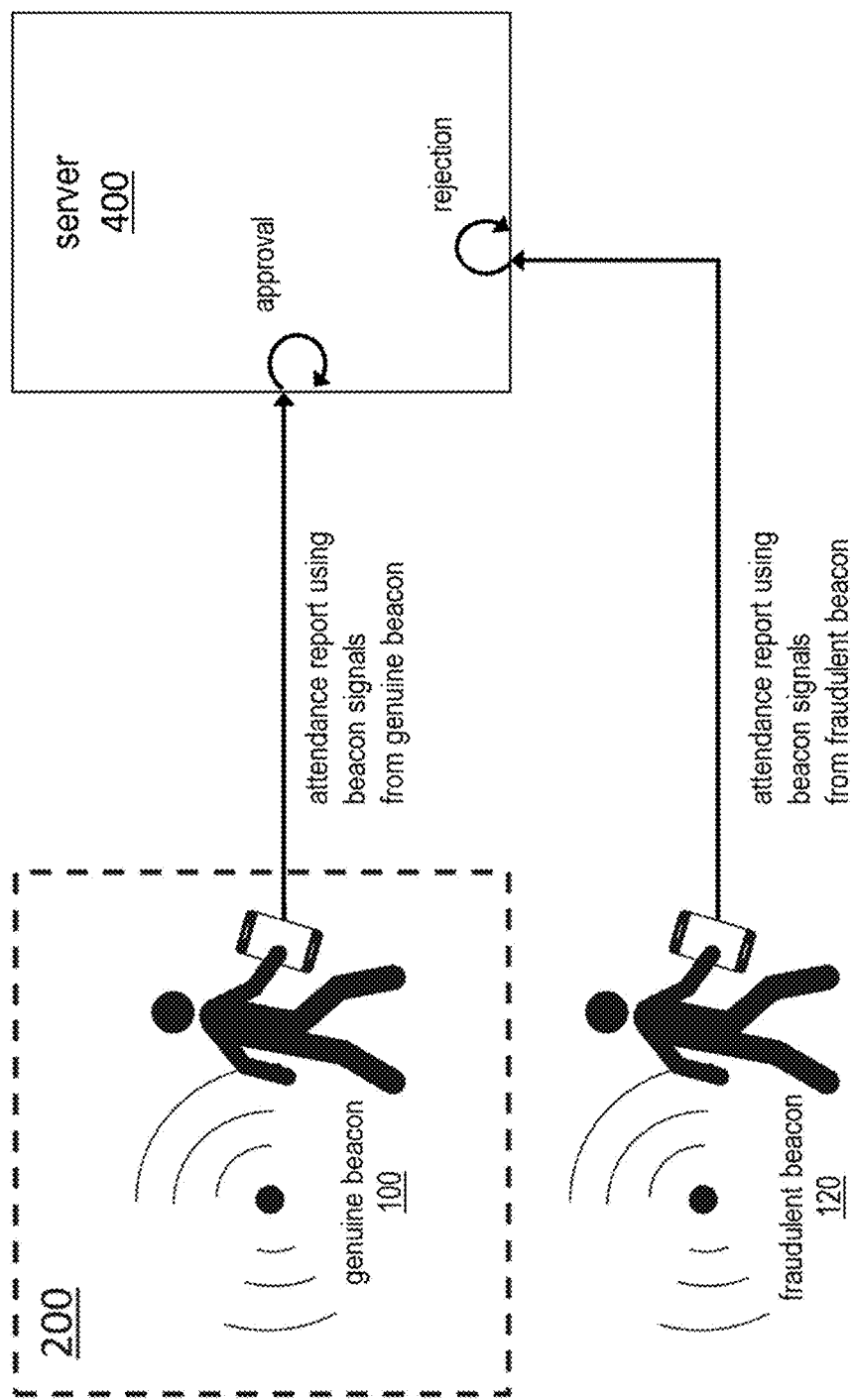
FIG. 3 illustrates approving and rejecting attendance recording in embodiments.

FIG. 1 illustrates an attendance recording system according to an aspect of the invention. A beacon 100 is installed in a workplace 200 and for broadcasts wireless signals. An employee goes to the workplace 200 with a smartphone 300, and the smartphone 300 detects wireless signals from the beacon 100. The smartphone 300 communicates with a server 400 via a communication network 600 for recoding the employee's attendance. The server is connected to a date store 500 that stores data relating to employees, workplaces and beacons. The data store 500 further stores attendance event log regarding the workplace and the employee.

Attendance Recording

The employee reports an attendance to the workplace 200 using a mobile application (smartphone application) installed on the smartphone 300. Thus, the smartphone 300 communicates with the server 400 to record clock-in and clock-out of the employee. When the employee selects an attendance recording request button (interface) on the mobile application, an analysis is made as to whether the employee is positioned in a registered workplace, and clock-in or clock-out of the employee is recorded if it is determined that the employee is in the registered workplace.

Using Beacon Signals

Wireless signals from the beacon 100 installed in the workplace is used to determine whether the employee is in the workplace 200. When the employee commands to make an attendance recording request on the mobile application, the smartphone 300 acquires wireless signals from the beacon 100. The acquired signals are analyzed, by the smartphone 300, by the server 400 or by the smartphone 300 and the server 400 in combination, to determine whether the employee is positioned in the workplace 200. The beacon's wireless signals are typically detected within a short distance from the beacon (e.g., 5 m, 10 m, or 15 m) and contain information that can be used to identify the beacon 100 and/or the workplace 200 where the beacon is installed. Accordingly, as the smartphone 300 and the server 400 analyze the acquired beacon signals, confirmation may be made as to whether the signals are from a particular beacon installed in the workplace 200. The employee's attendance may be recorded only when it is confirmed that the acquired signals are from the genuine (original) beacon installed in and registered to the workplace 200.

Recording Attendance Based on Hardware ID Unique to Beacon

The employee's attendance to the workspace 200 is verified and recorded when a unique identification (ID) of the beacon 100 acquired from the beacon signals matches beacon identification information stored in the data store (database) 500. In embodiments, a hardware ID uniquely identifying the beacon 100 in the data store 500 is compared to a hardware ID obtained from the beacon signals received at the smartphone 300. A media access control (MAC) address of a network interface of the beacon 100 may be used as the hardware ID for attendance recording.

Beacon Data Segment Carrying Hardware ID

In embodiments, the beacon 100 broadcasts signals according to a beacon standard (e.g. iBeacon, AltBeacon, Eddystone). The beacon standard specifies a data segment of beacon signals to carry a hardware ID unique to the beacon 100. However, the mobile application on the smartphone 300 may not retrieve the hardware ID from the specific data segment depending on the smartphone's operating system. For example, iOS on Apple's iPhone may not allow a mobile application to access or retrieve data from a particular data segment of beacon signals. In embodiments, to make the hardware ID available to the mobile application, the beacon 100 uses another data segment that is different from the specific data segment carrying the hardware ID according to the beacon standard. A data segment carrying the beacon's name, Beacon Name segment, is typically available to a mobile application, and can be used to carry the hardware ID and/or data that can be covered to the hardware ID.

Fraudulent Beacon

When the Beacon Name segment carries the hardware ID for use in for attendance recording, a fraudulent beacon 120 having the same data in the Beacon Name segment may deceive the attendance recording system. A user may create a fraudulent beacon using a computing device that can display data contained in the Beacon Name segment. In an attempt to create the fraudulent beacon 120, the user may read characters of the Beacon Name segment visible on the computing device and type in the characters to set-up a Beacon Name segment for the fraudulent beacon 120.

Invisible Characters in Beacon Name

When the genuine beacon's name (Beacon Name segment) includes an invisible character (a non-printable code that has no visual presentation), the user may not type in the complete genuine name for the fraudulent beacon 120 because the invisible character was not visible or revealed to the user. Accordingly, the fraudulent beacon's Beacon Name segment would lack the invisible character included in the genuine beacon's Beacon Name segment.

Incomplete Beacon Name

When the fraudulent beacon 120 is used to report attendance to the workplace 200, fraudulent beacon's Beacon Name segment is processed to obtain a hardware ID. Due to the invisible character missing in the fraudulent beacon's Beacon Name segment, a subsequent processing of the fraudulent beacon's Beacon Name segment would not provide the genuine beacon's hardware ID in a complete form. Accordingly, an attendance reporting based on signals of the fraudulent beacon 120 can be rejected based on a mismatch between the genuine beacon's hardware ID and a hardware ID obtained from the fraudulent beacon's signals. A process to reject a fraudulent attendance reporting will be described below in more details referring to FIGS. 9 and 10.

Data Segments of Beacon Signals

Figure 9:
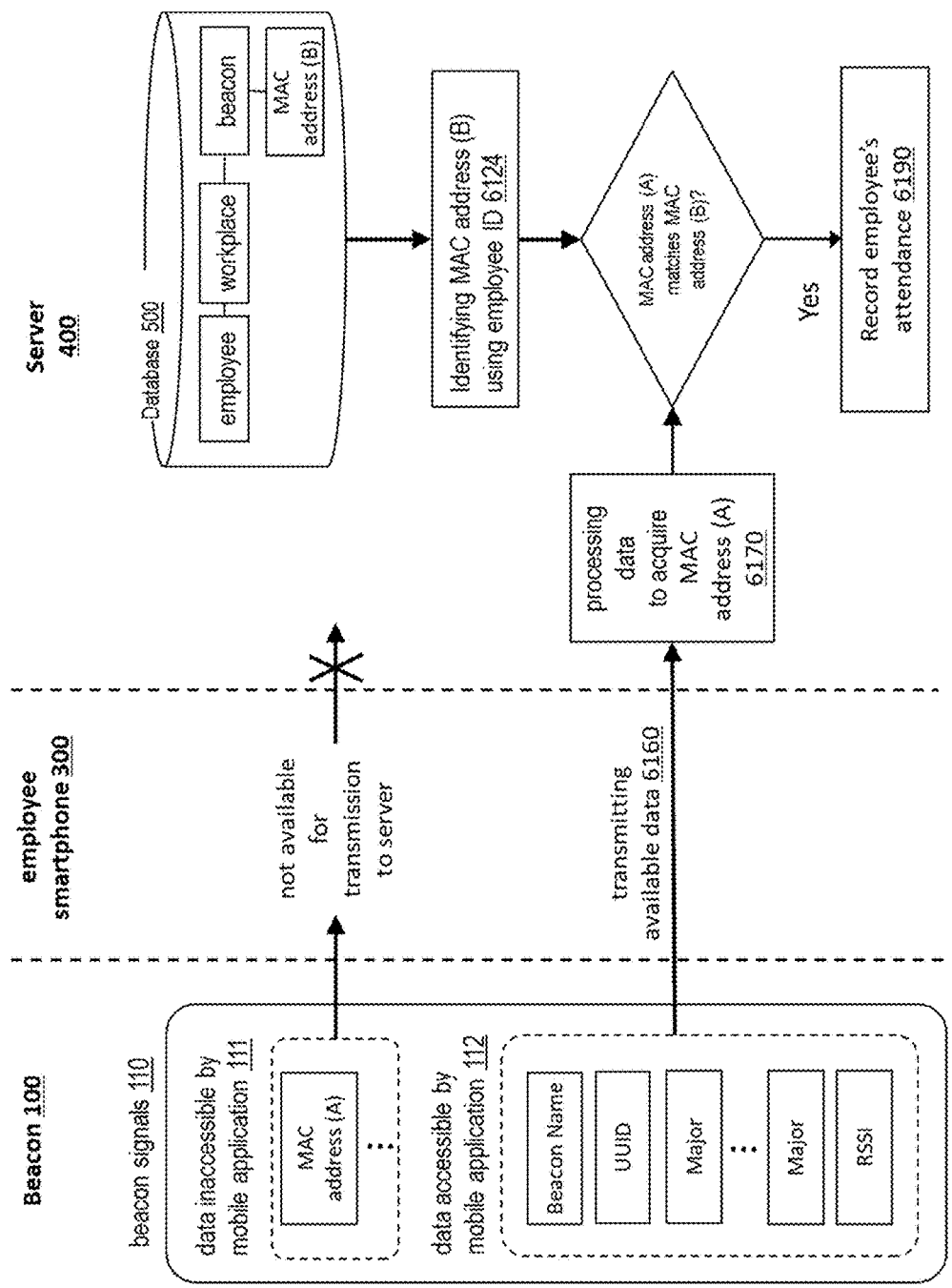
FIG. 9 illustrates data of beacon signals and processing of the data for attendance recording according to one embodiment.
Figure 10:
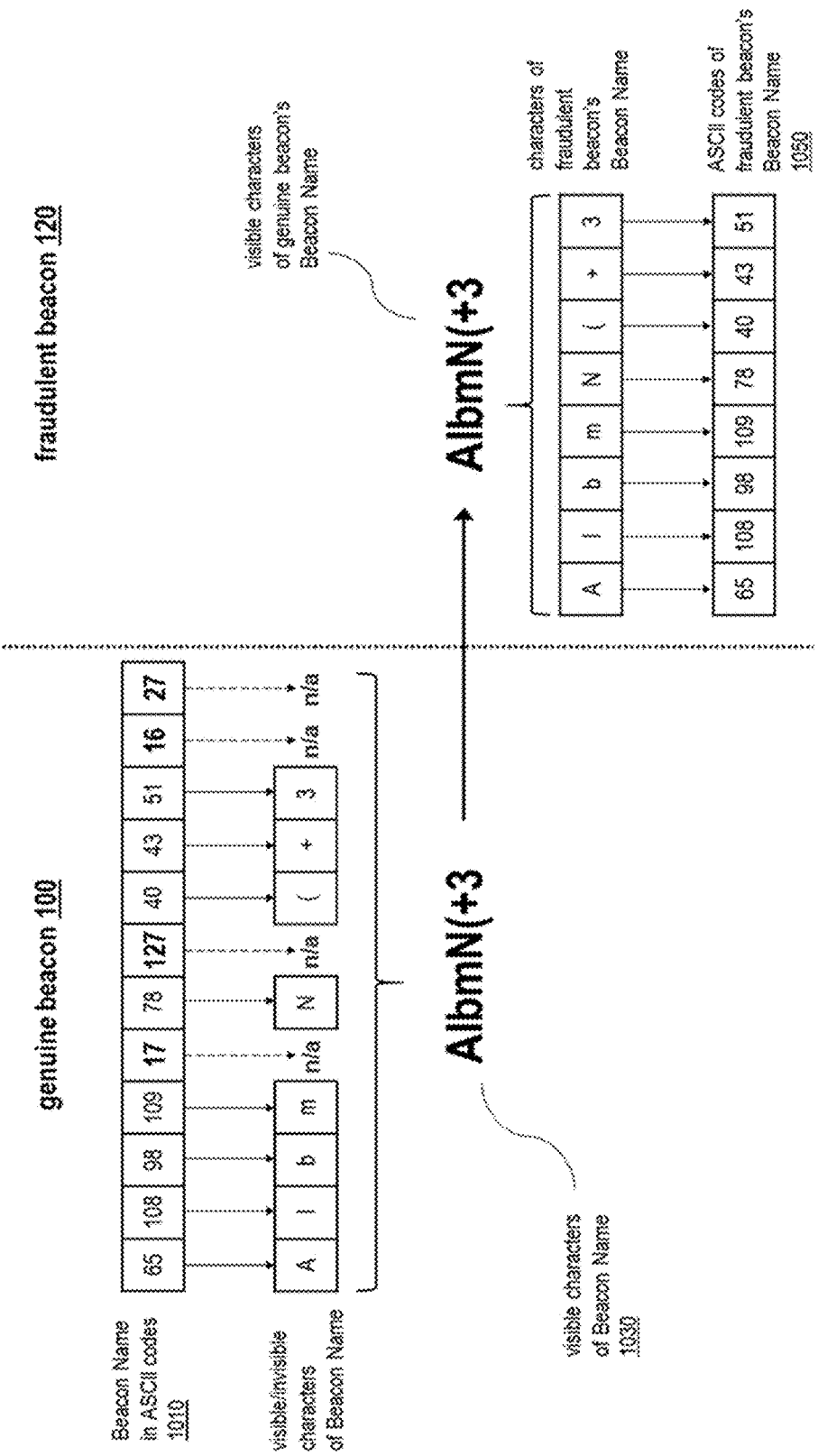
FIG. 10 illustrates a beacon name with invisible characters according to one embodiment.

In embodiments, referring to FIG. 9, signals 110 from the beacon carry one or more data selected from a MAC address, a Beacon Name, a Universally Unique IDentifier (UUID), a Major number, a Minor number and Received Signal Strength Indicator (RSSI). In embodiments, the beacon signals carry additional data other than the data listed above. In embodiments, the beacon signals 110 are configured using a beacon standard (e.g. iBeacon Specification, AltBeacon, Eddystone) known to the mobile application and the server. The beacon standard specifies one or more data segments for carrying the data listed above.

MAC Address as Hardware ID for Attendance Verification

In embodiments of FIG. 9, the MAC address assigned to a network interface of the beacon 100 is used as the hardware ID for verification of the employee's attendance. In certain embodiments, only a portion of the MAC address may be used as the hardware ID for use in attendance verification as long as the portion uniquely identifies the beacon 100 in the data store (database) 500. In some embodiments, an identifier different from the MAC address can be used as the hardware ID for attendance recording as long as the identifier uniquely identifies the beacon 100 in the data store 500. In some embodiments, a combination of two or more identifiers can be used as the hardware ID as long as the combination uniquely identifies the beacon 100 in the data store 500.

Universally Unique IDentifier (UUID) May not be Hardware ID

In embodiments, the hardware ID for attendance recording is different from a Universally Unique IDentifier (UUID) as the UUID may not be specific or unique to the beacon 100 and two or more beacons can be programmed to have the same UUID. In certain embodiments, the UUID can be used as the hardware ID as long as the UUID of the beacon is unique to the beacon 100.

MAC Address Inaccessible by Mobile Application

In embodiments of FIG. 9, the beacon signals carry the MAC address (A) in the data segment 111 that is not accessible by the mobile application installed on the smartphone 300 for attendance reporting. The mobile application may not retrieve or obtain the MAC address (A) directly from the data segment 111. In embodiments, a communication module of the smartphone 300 may obtain the MAC address (A) directly from the data segment 111, but does not release the MAC address (A) to a third-party application (e.g. the mobile application of attendance recording service). In certain embodiments, the mobile application may retrieve or obtain the MAC address (A) directly from the data segment 111.

Transmitting Accessible Data to Server

In embodiments of FIG. 9, the mobile application on the smartphone 300 transmits data available from the accessible data segment 112 to the server 400 such that the server 400 obtained the MAC address (A) from the data from the smartphone 300. In embodiments, the mobile application forwards data contained in the accessible data segment 112 without further processing to decode data in the data segment 112. In embodiments, the mobile application decodes data contained in the accessible data segment 112 and transmits a decoded data to the server 400. In embodiments, the mobile application has an algorithm, logic, or software for decoding data contained in the data segment 112 to obtain at least a portion of MAC address (A).

Server Obtains MAC Address from Data of Beacon Signals

In embodiments of FIG. 9, the server 400 processes data from the mobile application to obtain the MAC address (A). In embodiments, data from the mobile application includes at least a portion of MAC address (A). In embodiments, data from the mobile application includes one or more codes that can be restored (decoded) to at least a portion of the MAC address (A). The server 400 has an algorithm, a logic, a computer program or the like for processing data from the smartphone to obtain at least a portion of the MAC address (A).

Server Locates MAC Address from Data Store

In embodiments of FIG. 9, the server 400 locates MAC address (B) connected to the workspace 200 in the data store 500. In embodiments, the server identifies the employee via an authentication process, and locates the workspace 200 connected to the employee in the data store 500.

Server Compares MAC Addresses

In embodiments of FIG. 9, the server 400 compares Mac address (A) obtained from data of the beacon signals and Mac address (B) identified from the data store 500. When Mac address (A) and the Mac address (B) are the same, the server determines that the employee is in the workplace 200 and records the employee's attendance in the data store 500.

Invisible Character to Induce Incomplete Fraudulent Beacon

In embodiments of FIG. 9, the server obtains Mac Address (A) based data available from the data segment 112. The data segment 112 includes a Beacon Name segment that carries the beacon's name. If the Beacon Name segment of the genuine beacon 100 contains an invisible character, the invisible character will be missing in the fraudulent beacon's Beacon Name when the employee typed in only visible characters of the genuine beacon's Beacon Name to set-up the fraudulent beacon.

Invisible Characters

In embodiments, beacon signals from the genuine beacon 100 comprises at least one invisible character in one or more data segments. In embodiments, an invisible character (non-printable character) does not have a visual presentation (even a space) when a computing device displays beacon's information that contains the invisible character. In embodiments, the genuine beacon's name (Beacon Name segment) includes at least one selected among the invisible characters corresponding to decimal ASCII codes 1 to ASCII 31 (control code) and decimal ASCII code 127 (delete code). In certain embodiments, the genuine beacon's name further includes at least one space character (decimal ASCII code 32) at the end such that the at least one space character would not be recognizable when displaying the genuine beacon's name.

Attendance Recording System

Smartphone

In embodiments, the smartphone 300 is a mobile computing device capable of receiving and processing beacon signals and communicating with a server using a wireless communication network (a mobile phone network, a Wi-Fi network, etc.). In embodiments, the smartphone may include a position measurement module such as a GPS module. In embodiments, other mobile computing devices such as a tablet computer, a PDA, a notebook computer and the like capable of receiving and processing beacon signals and communicating with a server using a communication network may be used in replacement of the smartphone. In this disclosure, the term "smartphone" is used to refer to mobile computing devices for convenience.

Mobile Application

In embodiments, a mobile application for using the attendance recording service is installed in the smartphone 300. The mobile application includes one or more software modules and implements the functions of the attendance recording service by controlling hardware of the smartphone. In some embodiments, the mobile application is software separately produced for the attendance recording service and downloadable through a mobile application store or the like. In other embodiments, other computer programs of a smartphone, such as a web browser, can be used instead of or together with the mobile application to implement functions of the attendance recording service.

Server

In embodiments, the server 400 is formed with one or more computing devices. In embodiments, two or more computing devices are connected via a communication network to form the server 400. A computing device of the server 400 includes one or more processors, one or more memory and a communication interface for exchanging information with other devices. One or more software modules are installed in the server to implement functions of the attendance recording service while communicating with the smartphone.

Data Store

In embodiments, the data store 500 is implemented in one or more memory devices that are interconnected via computing networks and stores information about workplaces registered for the attendance recording service, beacons installed in the workplaces and employees working at the workplaces, and logs of attendance events. The workplaces, beacons, employees and logs of attendance events may be stored in separate database modules.

Network

In embodiments, the network 600 is a communication network for connecting the smartphone 300 and server 400, and includes wired and wireless communication connections. For example, the network 600 may include all or some of a mobile phone network, a Wi-Fi network, the Internet and a wireless or wired intranet.

Workplace

In embodiments, the workplace is a place in which employees work, such as an office, a store, a factory or the like, and refers to a place in which one or more beacons are installed so that the employees may receive beacon signals using a smartphone. In some embodiments, the workplace refers to a location or space (e.g., a door, a passage, a locker room and the like) within an office, store or factory that is designated for employees to stop by for receiving beacon signals to report attendance.

Beacon

In embodiment, the beacon 100 is a device for broadcasting wireless signals based on a wireless communication protocol such as Bluetooth. In embodiments, wireless communication protocols other than Bluetooth (e.g., Near Field Communication) may also be applicable to the beacon. In embodiments, the beacon 100 includes a processor, a memory and a broadcasting module. The processor, the memory and broadcasting module may be implemented with a microcontroller unit (MCU). In embodiments, the beacon maintains time information using a clock or a counter included therein. In embodiments, the beacon 100 maintains an algorithm to configure different broadcasting signals using a clock or a counter included in the beacon.

Beacon does not Communicate with Server Two Way

In embodiments, the beacon is a low-power broadcasting device operating with battery power, without a separate power supply thereto. When a beacon is assigned to a workplace and initialized, the beacon continuously or periodically broadcasts wireless signals as preprogrammed. In embodiments, the beacon broadcasts signals such that the signals may not be detect outside the workplace. Accordingly, the signals from the beacon 100 do not arrive at a server installed at a place other than the workplace 200. In embodiments, the beacon 100 does not perform two-way communication with the server 400 and does not have a communication module needed for such two-way communication with the server.

Process of Attendance Recording Service

Figure 4:
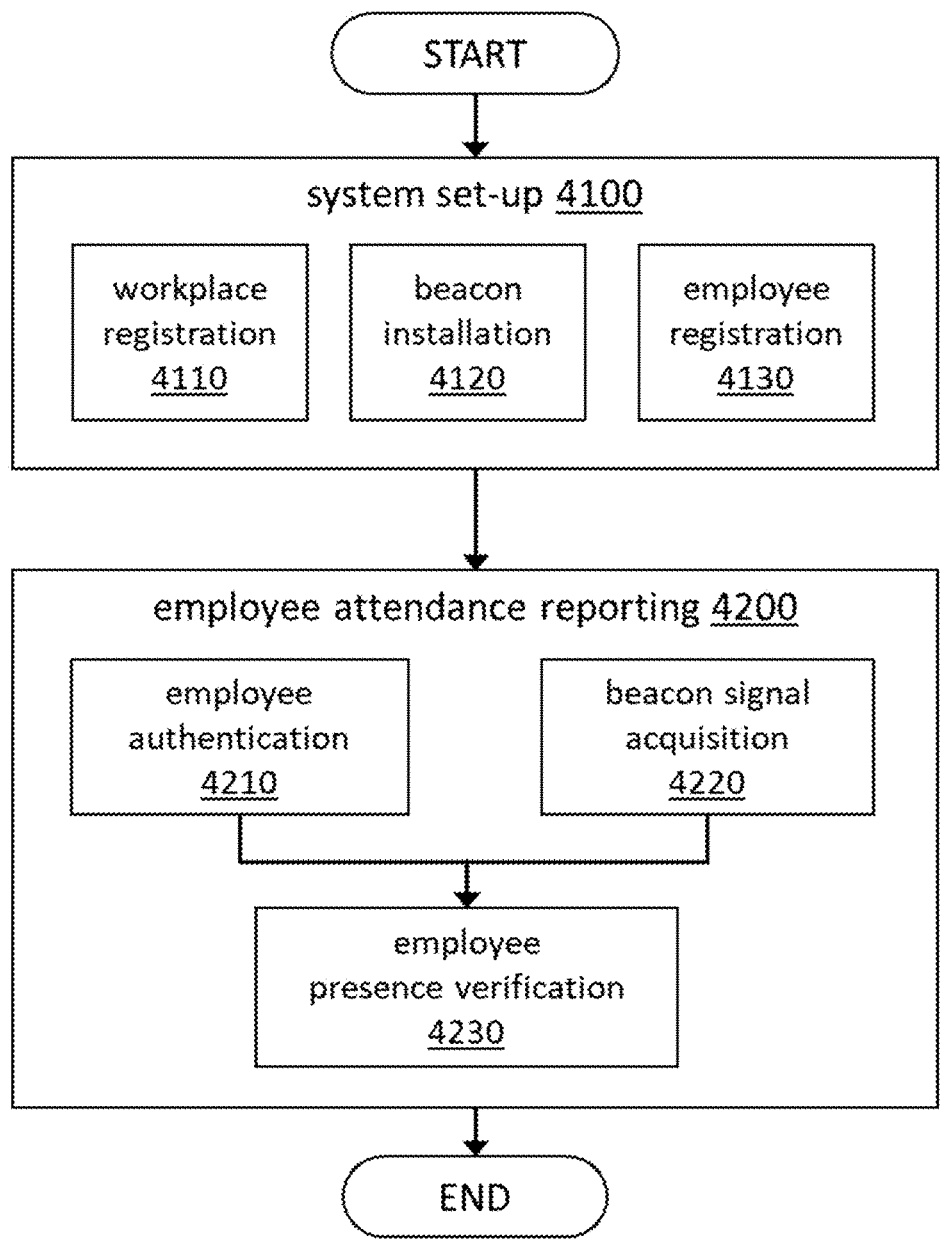
FIG. 4 is a flowchart of an attendance recording method according to one embodiment.

A setup process (4100) of the attendance recording system is performed prior to recording attendance using a smartphone. Referring to FIG. 4, setup of the attendance recording system includes registering a workplace (4110), installing a beacon in the registered workplace (4120), and registering an employee working at the workplace (4130). After the setup process is completed, when an employee signs in the attendance recording service using a mobile application of the smartphone 300, the server authenticates the employee (4210). Subsequently, when the smartphone receives signals of a nearby beacon (4220), the employee's presence in the workplace is verified based on analysis of the received signals of the beacon (4230).

Process of System Set-Up (4100)

Employer Sign-Up (5100, 5110, 5120)

Figure 5:
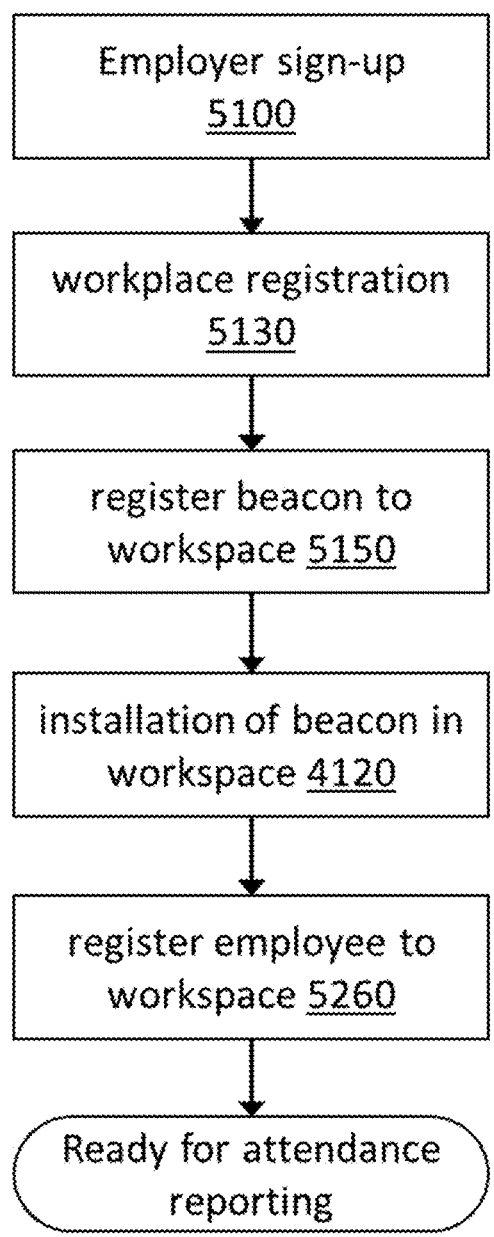
FIG. 5 illustrates a process of setting-up the attendance recording system of FIG. 1 according to one embodiment.
Figure 7:
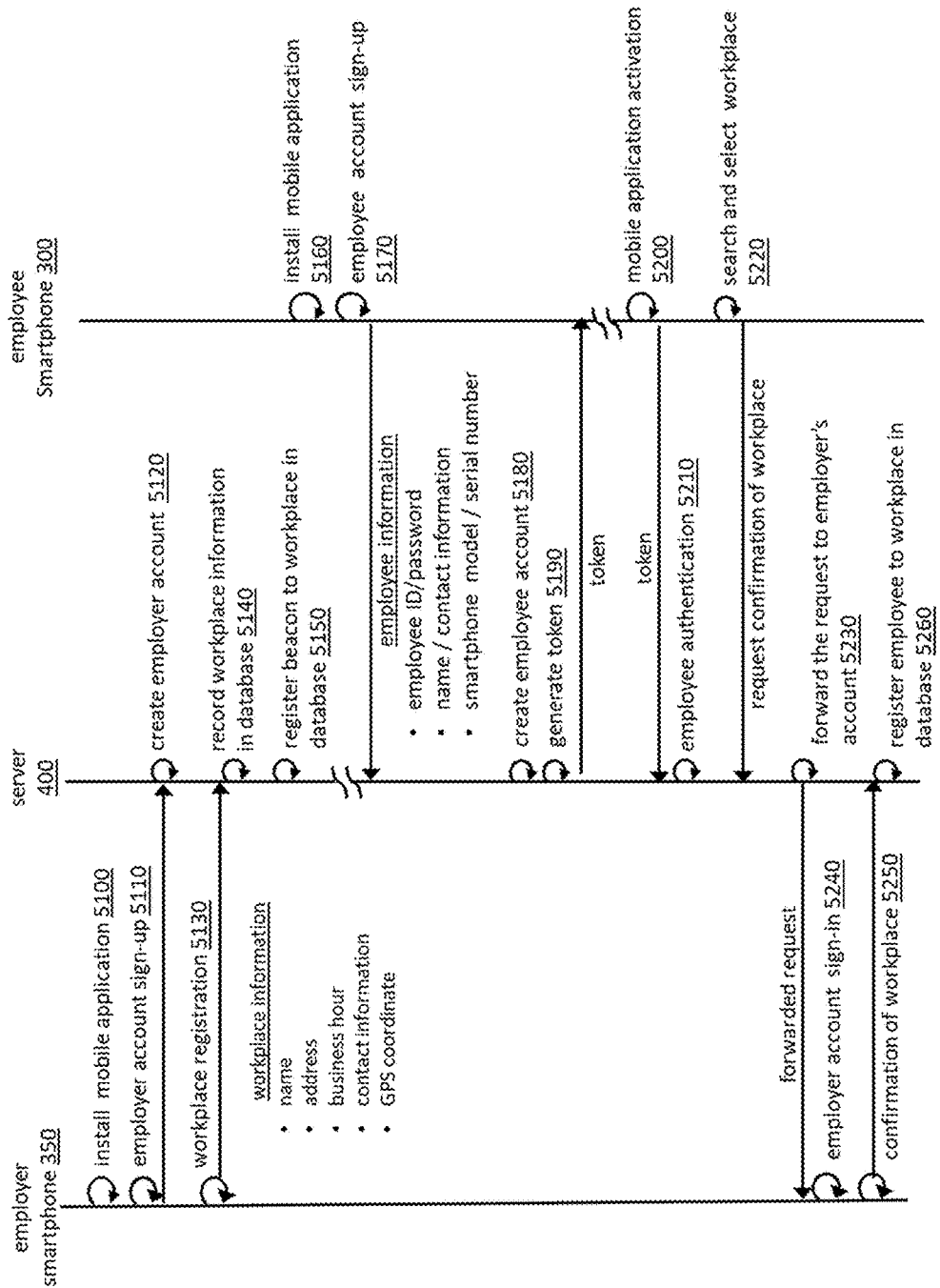
FIG. 7 illustrates details of the set-up process of FIG. 5 according to one embodiment.

Referring to FIGS. 5 and 7, in embodiments, an employer operating a workplace installs a mobile application on a mobile terminal 350 and signs up the attendance recording service using the mobile application (5100, 5110). The server collects information regarding the employer (e.g., a name, contact information, an address) from the employer, creates an account of the employer, and record the collected information in the database (5120).

Registration of Employer's Workplace (5130, 5140)

Referring to FIGS. 5 and 7, in embodiments, the employer subscribing the attendance recording service registers the workplace 200 in the database 500. The employer sends information of the workplace to the server 400. In embodiments, the information of the workplace provided to the server includes at least one of a name, an address, GPS coordinates, contact information of a manager and business hours of the workplace. In embodiments, the workplace 200 is linked to the employer in the data store 500.

Assign Beacon to Workplace (5150)

Referring to FIGS. 5 and 7, in embodiments, at least one beacon is assigned to each of the workplaces registered in the data store 500. In embodiments, beacons assigned to the workplace are linked to the workplace in the data store. In embodiments, the beacon is initialized before installing it in the workplace to which the beacon is assigned.

Initialization and Installation of Beacon (4120)

In embodiments, the genuine beacon 100 is programmed to broadcast wireless signals. In embodiments, wireless signals broadcast by the beacon includes (1) a hardware ID of the beacon and (2) one or more codes (encoded datum of the hardware ID) that can be decoded to at least a part of the hardware ID. In embodiments, beacon signals carry the one or more codes in a data segment (field) that is different from a data segment carrying the hardware ID. The one or more code includes at least one invisible character that has no visual representation when the one or more code are displayed on the mobile terminal 300. In embodiments, the one or more codes are generated by the server and stored generates in a memory of the beacon when initializing the beacon. When the beacon is installed in a workplace and it broadcasts the one or more codes stored its memory continuously or periodically (6100). In certain embodiments, at least one of the server and the beacon includes an algorithm, a logic, a computer program or the like for generating the one or more codes (encoded hardware ID) based on a current time. In embodiments, an operator of the attendance recording system can use various algorithms to encode the hardware ID into a character string that necessarily includes one or more invisible characters. In embodiments, in generating the one or more codes, various known encryption/encoding algorithms (e.g. DES, Twofish, Serpent, Blowfish) can be used. In embodiments, the one or more codes are generated based on a current time, and time of the beacon may be synchronized with the server during initialization of the beacon.

Employee Sign-Up (4130, 5160, 5170)

Referring to FIGS. 5 and 7, in embodiments, an employee working at the workplace registered by the employer installs the mobile application in the smartphone 300 (5160) and signs up for the attendance recording service (5170). The server 400 receives information of the employee and registers an account of the employee by recording the information of the employee in the database 500 (5180). In embodiments, the information on the employee provided to the server includes at least one of a name and a contact (an e-mail address and a phone number) of the employee, and a model name of the smartphone and a serial number of the smartphone.

Registration of Employee's Workplace (5220, 5230, 5240, 5250, 5260)

In embodiments, the employee searches for workplaces using the smartphone and selects the workplace where the employee works (5220). If the employee inputs (selects) the workplace where the employee works, a request to confirm the employee's workplace is transmitted from the smartphone to the server. The server 400 places a request to confirm the employee's workplace to the account of the employer (5230). If the employer signs in (5240) and confirms the employee's workplace (5260), the server 400 links the employee and the workplace in the database 500. In embodiments, a working schedule of the employee is recorded in the database 500 as well, based on the employer's confirmation (approval).

Token Generation and Employee Authentication (5190, 5200, 5210)

In embodiments, if the employee signs in using his/her ID and password at the mobile application, the server generates a token (secured unique code) corresponding to a combination of the ID and password and sends the token to the mobile application of the smartphone (5190). The token generated by the server and transferred to the smartphone is a secured unique identification code for identifying the employee signed in using the ID and the password. Accordingly, an identifier of the employee can be derived from the token. The mobile application stores the received token in the memory of the smartphone. If the mobile application is deactivated (terminated or put into standby) and then activated (executed) while the employee does not sign out, the token stored in the memory of the smartphone is transmitted to the server (5200, 6100, 6115). The server 400 performs authentication on the employee's account using the received token (5210, 6120).

Process of Attendance Recording (4200)

Broadcasting of Beacon Signals (6100)

Figure 6:
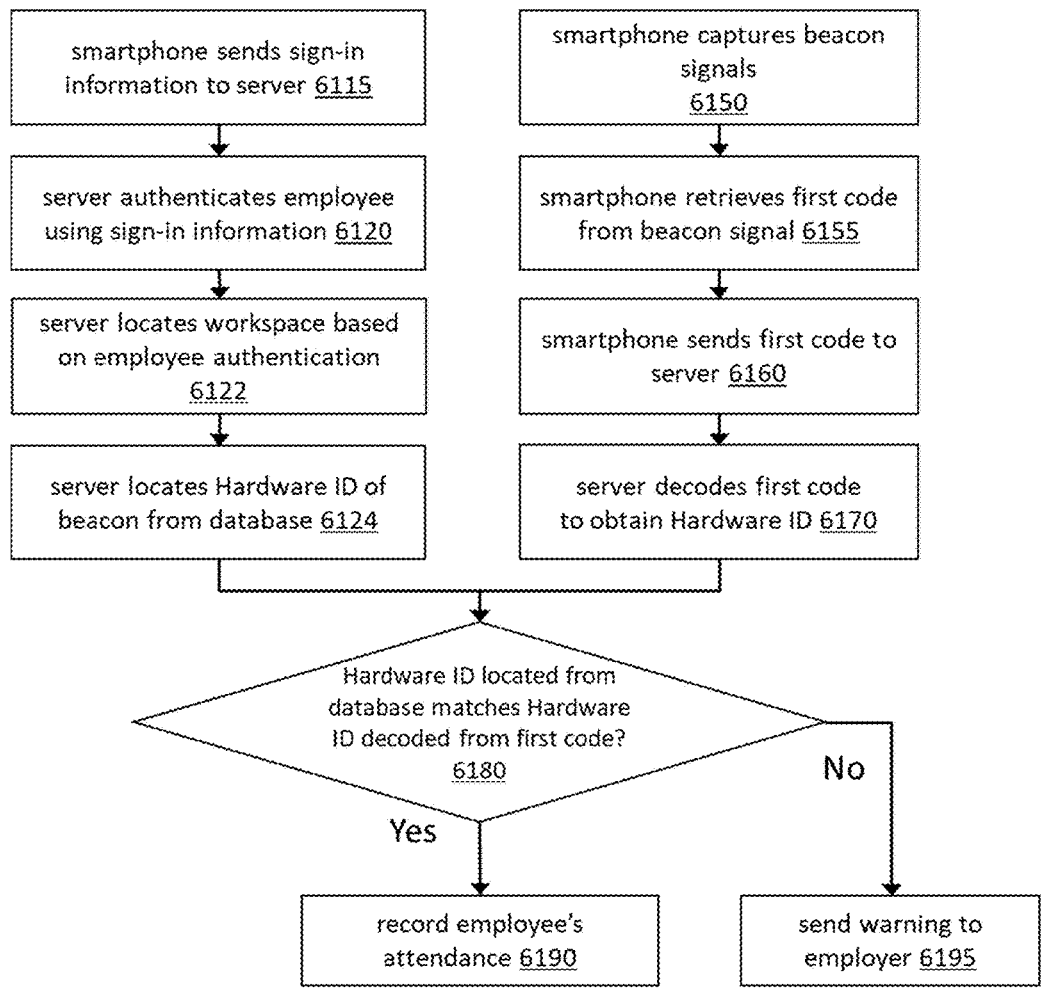
FIG. 6 illustrates a process of attendance recording according to one embodiment.
Figure 8:
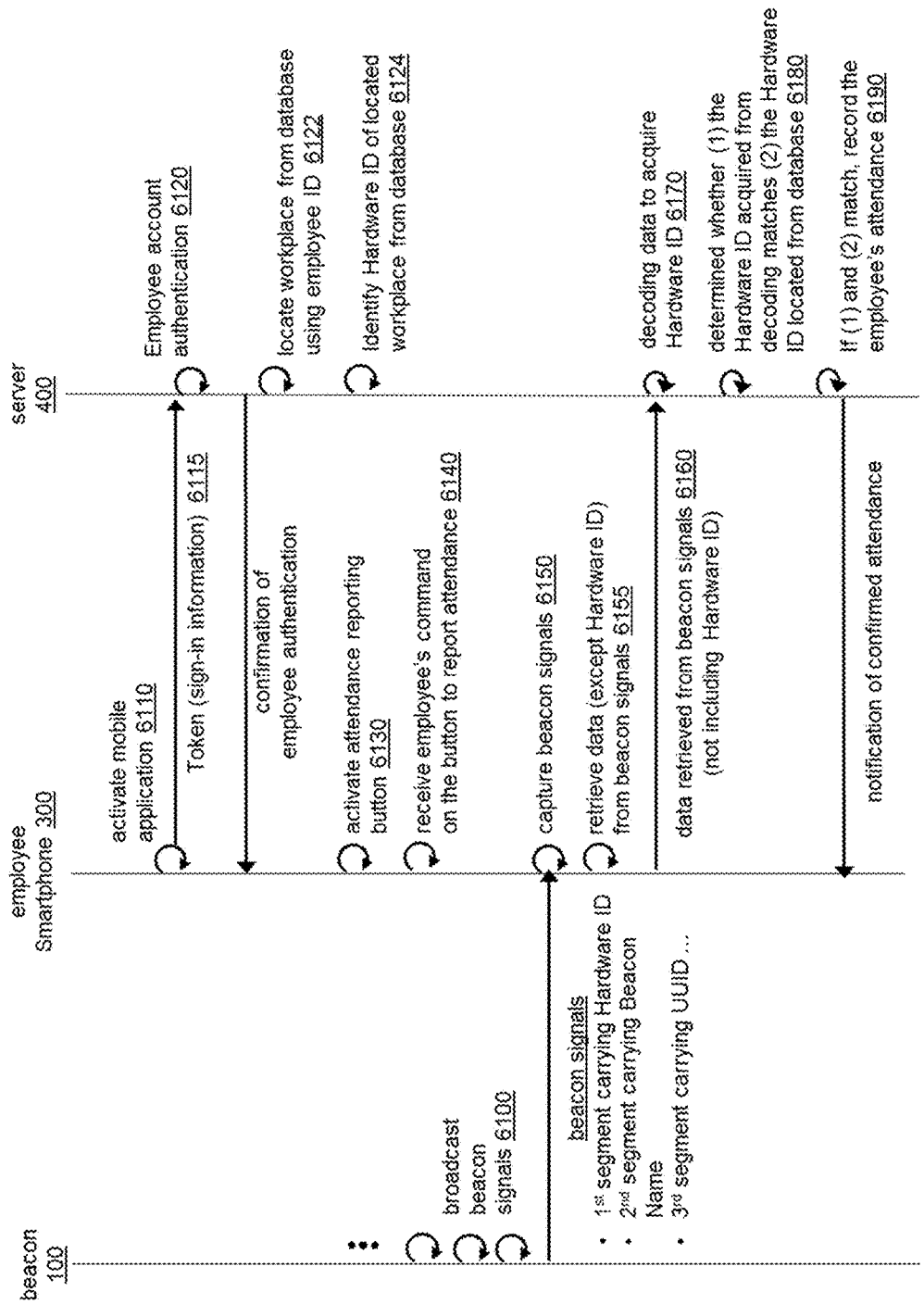
FIG. 8 illustrates details of the process of FIG. 6 according to one embodiment.

In embodiments, referring to FIGS. 6 and 8, the beacon broadcasts wireless signals continuously or periodically in its installed workplace (6100). In embodiments, the beacon 100 broadcasts one or more beacon data packets repeatedly. In embodiments, wireless signals 110 from the beacon 100 carries the hardware ID (MAC address) and one or more codes that can be decoded into the hardware ID (encoded hardware ID, encoded MAC address) in different data segments of a single beacon data packet. In embodiments, the one or more codes (encoded datum of hardware ID) is stored in one or more of Beacon Name, UUID, Upper, Under data fields that are accessible to the mobile application. In certain embodiments, the encoded datum is stored in one or more data segments that carry the beacon's name. In certain embodiments, the beacon broadcast the hardware ID (MAC address) and the encoded hardware ID (encoded MAC address) sequentially in different data packets, while the hardware ID (not encoded) is still inaccessible to the mobile application. In embodiments, referring to FIG. 9, the data segment 111 inaccessible by the mobile application and the data segment 112 accessible by the mobile application are in broadcasted in a single data packet. In certain embodiments, the one or more codes is carried in a data packet that is different from that of the hardware ID.

Employee Account Authentication (6110, 6115, 6120, 6122, 6124)

When the employee activates the mobile application (6110), the smartphone transmits sign-in information (the employee's ID and password for the attendance recording service, or token) to the server 400. In embodiments, the server 400 performs authentication for the employee using the sign-in information from the smartphone 300 (6115, 6120). In another embodiment, alternatively to or together with the sign-in information, other identifiers (the smartphone's ID) can be used to authenticate the employee. Referring to FIG. 8, immediately after the authentication for the employee is completed, without a delay, the server 400 identifies a workplace linked to the employee, a beacon linked to the workplace, and the hardware ID of the beacon installed in the employee's workplace from the database 500 (6122, 6124). In embodiments, the server 400 transmits to the smartphone one or more of an authentication confirmation message, the identified hardware ID and information on the workplace including at least one of a name, an address, GPS coordinates and business hours to the smartphone. In certain embodiments, the server 400 identifies the hardware ID of the beacon installed in the employee's workplace only after a request for attendance recording is received from the mobile application.

Activation of Attendance Recording Request Button, Receiving Employee Input (6130, 6140)

In embodiments, referring to FIG. 8, after the authentication of the employee's account is completed, the mobile application of the smartphone activates (displays or emphasizes) the attendance recording request button (an icon on the screen) and waits for an input of the employee. In embodiments, along with the attendance recording request button, the smartphone 300 also provides information of the workplace for which the employee's attendance will be recorded based on selection of the attendance recording request button. In embodiments, the information of the workplace for which attendance will be recorded is identified by the server 400 from the database 500 using the employee's identification that the server 400 provided to the smartphone 300 prior to activation of the attendance recording request button. If an input of the employee for the attendance recording request button is received (6140), the smartphone stores a time of the employee's input on the attendance recording request button and collects signals of nearby beacons.

Acquisition and Processing of Beacon Signals (6150)

In embodiments, the smartphone 300 collects beacon signals using its wireless communication module immediately after the employee presses the attendance recording request button. In certain embodiments, the smartphone collects beacon signals only for a predetermined duration (e.g., one second, three seconds, twenty seconds, one minute, five minutes or the like) after the attendance recording request button is selected by the employee. In embodiments, the smartphone continuously or periodically scans beacon signals regardless of selection of the attendance recording request button. For example, the mobile application running in the background scans beacon signals and records the detected beacon signals even while the mobile application is not displayed on a screen of the smartphone.

Screening of Beacon Signals

In embodiments, when multiple beacon signals are available at the same time, the smartphone 300 selectively acquires and processes a subset of the multiple beacon signals. In embodiments, referring to one or more segments of the beacon signals (UUID, Beacon Name), the smartphone selectively process signals from the beacons registered to the attendance recording service. In embodiments, when the smartphone receives a plurality of beacon signals, the mobile application selectively processes beacon signals that comprise a service ID known to the mobile application. In some embodiments, beacons of the same attendance recording service uses the same service ID as a prefix or suffix in one or more data segments. In embodiments, the smartphone verifies whether a service ID of the sensed beacon signals is identical to at least one of service IDs registered in the database. The server provides the smartphone with one or more service IDs registered in the database before the smartphone acquires the beacon signals. In embodiments, one or more service IDs registered in the database to attendance recording service was stored in a memory of the smartphone when initializing the beacon. In embodiments, signals from the beacon 100 carries a service ID in a data segment that carries the encoded datum of hardware ID. In embodiments, signals from the beacon 100 carries a service ID in a data segment that is different from that of the encoded datum of hardware ID.

Mobile Application Accesses Data in Beacon Signals (6155, 6160)

In embodiments, according to a security policy of the mobile terminal's operating system (OS), the mobile application does not have retrieve or access data from a beacon signal segment 111 that carries an un-encoded hardware ID (MAC address) of the beacon. Accordingly, the mobile application is not capable of retrieving the hardware ID (un-encoded) directly from the beacon signal segment 111. In embodiments, to obtain the hardware ID of the beacon, an encoded version of the hardware ID (encoded datum, one or more codes that can be decoded to at least a portion of the hardware ID) contained in another data segment 112 is analyzed by the smartphone, by the server, or by the server and the smartphone in combination. When the mobile application does not have an algorithm, logic, or software to decode the encoded version of the hardware ID, the mobile application retrieves the encoded version of the hardware ID from the data segment 112 (6155), and transmits the retrieved data to the server for decoding (6160). In certain embodiments, the mobile application is capable of decoding the encoded datum and transmits the decoded hardware ID to the server.

Employee Presence Verification using Decoded Hardware ID (6170, 6180)

In embodiments, when the decoded hardware ID obtained from the beacon signals matches the hardware ID identified from the database based on the employee's identification, it is determined that the beacon broadcast the beacon signals is a valid (original) one. In embodiments, referring to FIG. 8, on receiving a beacon datum containing the encoded datum from the smartphone, the server decodes the encoded datum to obtain a decoded hardware ID. The server then compares the decoded hardware ID against the hardware ID identified from the database according to authentication of the employee. In certain embodiments, the mobile application decodes the encoded datum and transmits a decoded hardware ID to the server for comparison with the hardware ID identified from the database. In certain embodiments, verification of matching between the hardware ID of the beacon signals and the hardware ID identified from the database is performed at the smartphone. The mobile application decodes the encoded datum and compares the decoded hardware against a hardware ID identified from the database and transmitted from the server.

Verification of Hardware ID—Limited Comparison with Beacons of Employee Workplace In the hardware ID verification (6170, 6180) of FIG. 8, the decoded hardware ID is compared with the hardware ID of the beacon installed in the authenticated employee's workplace, rather than with all beacon hardware IDs stored in the database 500. When the hardware ID obtained from the beacon signals is compared with limited numbers of target hardware IDs selected based on the identifier of the employee, faster verification is possible. In embodiments, when a working schedule of the employee is considered additionally, among the beacons of the workplace linked to the employee, the numbers of target hardware IDs to be considered for the hardware ID verification can be further reduced.

Recording Employee's Attendance (6190)

In embodiments, if (1) the decoded hardware ID obtained using the beacon datum from the smartphone matches (2) the hardware ID identified from the database using the employee's identification, the server 400 determines that the employee has requested attendance recording at the employee's workplace and records the employee's attendance in the database. The server transmits a confirmation of recorded attendance to the smartphone.

Database

Workplace Information Database

FIG. 11 illustrates information of workplaces recorded in a database according to an embodiment. A unique identifier is assigned to each of the workplaces. A unique identifier of a beacon assigned to a workplace is linked to the unique identifier of the workplace. A unique identifier of an employee working at the workplace is also linked to the unique identifier of each workplace. In embodiments, information such as a name, an address, GPS coordinate information, business hours of a workplace is linked to the unique identifier of the workplace and stored in the database.

Employee Information Database

FIG. 12 illustrates information of employees recorded in a database according to embodiments of the present invention. A unique identifier is assigned to each of the employees. In embodiments, employee's contact information, a smartphone device model, a smartphone serial number, a workplace and a working schedule at the workplace are recorded in the database in connection with the identifier of the employee.

Beacon Information Database

FIG. 13 illustrates information of beacons stored in a database according to an embodiment of the present invention. In connection to an identifier of a beacon, information such as a workplace where the beacon is installed, an initialization or installation date of the beacon, a firmware version of the beacon, a pin code for updating the beacon, and a beacon data transmission period may be recorded in the database.

Attendance Log Database

FIG. 14 illustrates an attendance log stored in a database according to an embodiment of the present invention. The attendance log includes information regarding clock-in and clock-out of employees. For example, information such as a time when an employee reported workplace check-in (Clock-in time), an identifier of a smartphone used for check-in reporting (Clock-in smartphone ID), an identifier of a beacon of which signals are sensed by the smartphone at the time of check-in reporting (Clock-Beacon ID) can be recorded in the database in connection with the identifier of the employee and the identifier of the workplace.

Configuration of Server

In embodiments, the server 400 includes one or more processors, a memory configured to store software executable by the processors, and a communication interface for communicating with other devices. The server implements features of the attendance recording system based on execution of software modules. In embodiments, the server has software modules such as a token generation module, an authentication module, a hardware ID verification module, a hardware ID encoding module, a hardware ID decoding module, an attendance event log management module, and an abnormal phenomenon detection module.

Transmission Period of Beacon Data

In embodiments, a beacon periodically transmits one or more of the hardware ID of the beacon, the encoded datum, UUID, Major number, Minor number, and an service ID of the attendance recording service. The data transmission period can be, for example, one selected among a half second, one second, two seconds, three seconds, five seconds, ten seconds and one minute. In embodiments, the data transmission period of the beacon is longer than the time period allowed for beacon signals collection (time-out) by the smartphone in response to the employee's selection of the attendance recording request button. For example, if the smartphone collects beacon signals only for three seconds as the employee selects the attendance recording request button, the beacon is set to transmit its data at least one time during the allowed three seconds. In other embodiments, the data transmission period of the beacon is adjusted to generate wireless signals more frequently during a business opening time period (or a business closing time frame) of the workplace, when compared to the other time periods. For example, when the business opening of workplace A is 9 a.m., a beacon installed at the workplace A may transmit its data more frequently during a time period starting 9:30 a.m. than a time period ending 9:30 a.m. (for example, from 8:30 a.m. until 9:30 a.m.).

Attendance Includes Clock-In and Clock-Out

In embodiments, attendance means clock-in and clock-out of an employee. In this application, procedures of recording clock-in of an employee and their description can be applied for procedures of recording clock-out.

Repeated Beacon Signals

In embodiments, if the server and/or the smartphone determines that beacon signals collected at the smartphone 300 are duplicated to previously collected beacon signals having the same hardware ID, the employee's attendance recording request may be denied. For example, if two beacon signals having the same hardware ID collected with a time difference (one hour), it may be determined as an indication of potential abuse.

Attendance Recording Based on Smartphone ID Match

In embodiments, when the employee activates the mobile application in the smartphone 300, the identifier of the smartphone is transmitted to the server. The server 400 determines whether the transferred identifier of the smartphone matches the identifier of the smartphone linked to the employee in the database. In some embodiments, the server may record attendance of the employee only when matching between the smartphone identifiers is verified. In some embodiments, if the identifier of the smartphone transferred to the server does not match the identifier recorded in the database, the server may not approve an attendance recording request of the employee, notify mismatch of the identifier to the manager of the store, or transmit a request to register a new smartphone to the employee.

Combination of Multiple Criteria for Attendance Recording

In embodiments, the attendance recording system may approve employee's attendance recording request or determine a potential abuse by considering at least one of the following criteria including (1) whether the hardware ID acquired from the beacon signals at the smartphone matches the hardware ID identified from the database using the employee's identifier, (2) whether location of the smartphone matches location of the employee's workplace (within a predetermined range), (3) whether the beacon signals currently acquired for attendance recording are the same as beacon signals previously used to record the same employee's attendance, and (4) whether the employee uses different smartphones for attendance recording.

Computing Device and Computer-Executable Instructions for Implementing Embodiments Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

What is claimed is:

1. A method of processing attendance recording, the method comprising:

providing at least one database comprising data identifying a first employee, a first facility where the first employee works and a first beacon for use in the first facility, wherein in the at least one database, a first employee datum identifying the first employee is linked to a first facility datum uniquely identifying the first facility, wherein the first facility datum is linked to a first beacon datum uniquely identifying the first beacon in the at least one database;

providing the first beacon for installation in the facility, wherein the first beacon is configured to broadcast beacon signals comprising a first segment and a second segment that is separate from the first segment, wherein the first segment carries a first media access control (MAC) address uniquely identifying the first beacon, wherein the second segment carries a first code that can be decoded into at least a portion of the first MAC address, wherein the first code comprises at least one invisible character that has no visual representation when the first code is displayed on the first mobile terminal;

providing a mobile application for installing on a first mobile terminal of the first employee, the mobile application is configured to perform communication between the server and the first mobile terminal;

providing a server comprising at least one computing device configured to communicate with the first mobile terminal and further configured to access the data stored in the at least one database;

subsequent to installation of the first beacon in the first facility and further subsequent to installation of the mobile application on the first mobile terminal, authenticating the first employee based on communication between the server and the first mobile terminal such that the server locates the first employee datum of the first employee in the at least one database, wherein authenticating the first employee is performed by the server, by the first mobile terminal, or by the server and the first mobile terminal in combination;

subsequent to authentication of the first employee, locating, in the at least one database, the first beacon datum identifying the first beacon, using on the first employee datum available from authentication of the first employee, wherein the first beacon datum can be located using the first employee datum as the first employee datum is linked to the first facility datum and the first facility datum is linked to the first beacon datum in the at least one database;

in response to the first employee's command for reporting attendance on the first mobile terminal, processing the second segment to decode the first code comprising at least one invisible character for obtaining at least a portion of the first MAC address without referencing to the first segment, wherein processing the second segment is performed by the server, by the first mobile terminal, or by the server and the first mobile terminal in combination;

subsequent to locating the first beacon datum in the at least one database and further subsequent to processing of the second segment to decode the first code, determining if the at least a portion of the first MAC address decoded from the first code matches the first beacon datum located in the at least one database; and upon determining that the first MAC address decoded from the first code matches the first beacon datum located in the at least one database, recording, in the at least one database, the first employee's attendance at the first facility.

2. The method of claim 1, wherein the mobile application is not capable of retrieving the first MAC address from the first segment of the beacon signals, but is configured to retrieve from the second segment of the beacon signals, the first code that can be decoded into the at least a portion of the first MAC address.

3. The method of claim 1, wherein the mobile application processes the second segment to obtain the first code and transmits the first code to the server, wherein the server processes the first code received from the mobile application to obtain the at least a portion of the first MAC address.

4. The method of claim 1, wherein the first code comprises at least one invisible character selected among a set of invisible characters corresponding to American Standard Code for Information Interchange (ASCII) code 1 to ASCII code 31, and ASCII code 127.

5. The method of claim 1, wherein the second segment carries the first beacon's name, wherein the first beacon's name in the second segment comprises at least a portion of the first code.

6. The method of claim 1, wherein the second segment carries a Universally Unique IDentifier (UUID) of the first beacon, wherein the UUID in the second segment includes at least a portion of the first code.

7. The method of claim 1, wherein the second segment carries a Major number of the first beacon, wherein the Major number in the second segment includes at least a portion of the first code.

8. The method of claim 1, wherein the second segment carries a Minor number of the first beacon, wherein the Minor number in the second segment includes at least a portion of the first code.

9. The method of claim 1, wherein the beacon signals further comprise a third segment carrying a Universally Unique IDentifier (UUID) of the first beacon.

10. The method of claim 9, wherein the beacon signals further comprise a fourth segment carrying a Major number of the first beacon, and further comprise a fifth segment carrying a Minor number of the first beacon.

11. A beacon for use in attendance recording, the beacon comprising:
at least one memory;
at least one wireless communication module; and
at least one controller configured to access data stored on the at least one memory and further configured to control the at least one wireless communication module for generating beacon signals;
wherein the beacon signals comprise a first segment, a second segment separate from the first segment, and a third segment separate from the first and second segments,
wherein the first segment carries a first media access control (MAC) address uniquely identifying the first beacon,
wherein the second segment carries a first code that can be decoded into at least a portion of the first MAC address, wherein the first code comprises at least one invisible character that has no visual representation when the first code is displayed on the first mobile terminal,
wherein the secong segment or the third segment carries a Universally Unique IDentifier (UUID) of the first beacon.

12. The beacon of claim 11, wherein the second segment carries the first beacon's name, wherein the first beacon's name in the second segment comprises at least a portion of the first code.

13. The method of claim 11, wherein the UUID in the second segment includes at least a portion of the first code.

14. The beacon of claim 11, wherein the second segment carries a Major number of the first beacon, wherein the Major number in the second segment includes at least a portion of the first code.

15. The beacon of claim 11, wherein the second segment carries a Minor number of the first beacon, wherein the Minor number in the second segment includes at least a portion of the first code.

16. The beacon of claim 11, wherein the beacon signals further comprise a fourth segment carrying a Major number of the first beacon, and further comprise a fifth segment carrying a Minor number of the first beacon.

17. The beacon of claim 11, wherein the first code comprises at least one invisible character selected among a set of invisible characters corresponding to American Standard Code for Information Interchange (ASCII) code 1 to ASCII code 31, and ASCII code 127.

* * * * *

UNITED STATES PATENT AND TRADEMARK OFFICE
CERTIFICATE OF CORRECTION

| | |
|---|---|
| PATENT NO. | : 10,515,343 B1 |
| APPLICATION NO. | : 16/430180 |
| DATED | : December 24, 2019 |
| INVENTOR(S) | : Jinyong Kim and Wonyoung Choi |

Page 1 of 1

It is certified that error appears in the above-identified patent and that said Letters Patent is hereby corrected as shown below:

In the Specification

At Column 2, Line 52, delete "an" between "carries" and "a Major".

At Column 2, Line 55, delete "an" between "carries" and "a Minor".

At Column 5, Line 10, replace "recoding" with --recording-- after "600 for".

In the Claims

In Claim 1, at Column 16, Line 50, insert --first-- between "the" and "facility".

In Claim 1, at Column 16, Line 60, replace "the first mobile" with --a first mobile--.

In Claim 1, at Column 16, Line 65, replace "the server" with --a server--.

In Claim 1, at Column 16, Line 66, replace "a server" with --the server--.

In Claim 11, at Column 18, Line 31, delete "first" after "uniquely identifying the".

In Claim 11, at Column 18, Line 37, replace "the first mobile" with --a mobile--.

In Claim 11, at Column 18, Line 38, replace "secong" with --second--.

In Claim 11, at Column 18, Line 39, delete "first" after "Universally Unique IDentifier (UUID) of the".

In Claim 13, at Column 18, Line 45, replace "method" with --beacon--.

Signed and Sealed this
Fifteenth Day of August, 2023

Katherine Kelly Vidal
*Director of the United States Patent and Trademark Office*